United States Patent [19]

Engelbach

[11] Patent Number: 4,691,798
[45] Date of Patent: Sep. 8, 1987

[54] SYSTEM FOR AUTOMATICALLY PREVENTING TURNOVER OF TWO WHEELED VEHICLES

[76] Inventor: Thomas S. Engelbach, 1037 Monterey Blvd., Hermosa Beach, Calif. 90254

[21] Appl. No.: 786,078

[22] Filed: Oct. 10, 1985

[51] Int. Cl.⁴ .............................................. B62D 61/12
[52] U.S. Cl. .................................................... 180/209
[58] Field of Search ................ 180/209, 271; 280/6.1, 280/303, 755

[56] References Cited

U.S. PATENT DOCUMENTS

| | | | |
|---|---|---|---|
| 1,858,743 | 5/1932 | Longstreth | 180/209 |
| 3,277,840 | 10/1966 | Li | 180/209 |
| 3,410,357 | 11/1968 | Summers | 180/209 |
| 3,465,840 | 9/1969 | Summers | 180/209 |
| 4,133,402 | 1/1979 | Soo Hoo | 180/209 |
| 4,513,837 | 4/1985 | Archer | 180/209 |

Primary Examiner—John J. Love
Assistant Examiner—Ross Weaver
Attorney, Agent, or Firm—Irving Keschner

[57] ABSTRACT

A system for automatically sensing and preventing turnover of two wheeled vehicles by use of two outrigger wheels for stability. Turnover of a two wheeled vehicle, such as a motorcycle, can take place when one of the tires slides laterally to a point that normal driving maneuvers cannot reestablish traction. Uncontrollable tires slip (which increases the rate of body roll) is sensed with a rate gyro or accelerometers. As tire slip becomes uncontrollable, traction will approach zero and the roll axis of the vehicle moves from a line between the two points that the tires contact the road to the center gravity of the vehicle. The polar moment of inertia is simultaneously reduced which allows the vehicle to roll at an increased rate. An on-board vehicle microcomputer receives continuous information from the gyro and determines if the rate of body roll is higher than the range possible when the tires have traction. If the tires lose traction, then the rate of roll will increase and the microcomputer sends a signal to a servo valve which opens the proper ports to allow compressed air to pass to a pneumatic cylinder which will force the outrigger wheels down to right the vehicle.

22 Claims, 10 Drawing Figures

SYSTEM FOR AUTOMATICALLY PREVENTING TURNOVER OF TWO WHEELED VEHICLES

BACKGROUND OF THE INVENTION

1. Field of the Invention

This invention relates to an automatic system for sensing and preventing turnover of two-wheeled (single track) vehicles while enabling normal riding techniques in all but out of control situations.

2. Description of the Prior Art

Two wheeled, or single track, vehicles, such as bicycles, motorcycles and full body vehicles have long been commercially available. For safety reasons, manufacturers have added stabilizing means to the vehicles to stabilize it against overturning when stopped, moving at low speeds or when moving on wet or otherwise slippery roadways, the latter conditions causing tire slip to occur. The danger of overturning is increased when the vehicle is carrying a passenger because the passenger may make moves which could upset the driver or cause him to move incorrectly, so that together they destroy the normal lateral balance of the vehicle and thus overturn.

One prior art technique of stabilizing single track vehicles is to use a large passive gyro and utilize its precessional moment to control body roll. In U.S. Pat. No. 3,465,840 to Summers for example, the vehicle is stabilized against roll by a large brute force gyro having a lateral spin axis and a vertical gimbal axis. Roll equilibrium is maintained by application of a vehicle righting gimbal force as a function of gimbal precession rate. Gimbal drift resulting in gimbal displacement is erased by application of a drift correcting gimbal torque in the direction of the displacement.

While the method disclosed in Summers has met with some success in stabilizing large ships, the weight, expense and complexity of this method have barred two wheeled vehicles from using the method in an economical manner.

A second type of stabilizing method, which has been commercially available, uses retractable outrigger wheels. These wheels normally retract as the vehicle gains momentum and the driver assumes the responsibility of balancing the vehicle similar to a normal motorcycle. U.S. Pat. No. 3,700,059 to Sutton discloses a vehicle stabilizing system wherein the outrigger wheels can be steered in the direction of travel, rotated to meet road speed and raised or lowered through an electric, mechanized system.

The main drawback to all these outrigger wheel systems is that they do not provide automatic stability. All of these systems require the driver to decide when the outrigger wheels should be raised or lowered and then perform that function either manually or with a mechanized system.

A recent vehicle stabilization device using outrigger wheels is disclosed in U S. Pat. No. 4,513,837 to Archer. A control system is provided which includes a first operational mode in which the outrigger wheels are automatically retracted only at vehicle speeds above a pre-set level. A speed responsive switch is responsive to wind which enters an opening in the front housing grill. This automatic sensing technique for stabilization control purposes reacts only to vehicle speed and does not have means to control the vehicle from overturning above speeds of approximately 35 miles per hour.

A fourth method for vehicle stabilization is disclosed in U.S. Pat. No. 3,124,007 to Swinney and utilizes a moveable weight which is controlled by a gyro. The disadvantages of this system is that it is heavy, expensive and complex, the same disadvantages associated with the passive gyro systems set forth hereinabove.

In contrast, an automatic stabilization control system which is relatively inexpensive and lightweight, yet provides positive control to prevent overturning under any but the most severe circumstances would be a significant improvement to the aforementioned prior art systems.

SUMMARY OF THE INVENTION

The present invention provides a system for automatically sensing and preventing turnover of single tracked, or two wheeled vehicles with outrigger wheels. Turnover of a two wheeled vehicle can take place when one of the tires slides laterally to a point that normal driving maneuvers cannot reestablish traction. In order to stabilize the vehicle and prevent turnover, uncontrollable tire slip is monitored by a rate gyro or accelerometer. The gyro or accelerometer senses changes in the rate of body roll. As tire slip continues to increase, traction will approach zero and rate of roll will increase measurably. A small on board microcomputer receives continuous electrical information from the gyro (or accelerometer) and determines via an algorithm if data inputs of rate of roll are higher than achievable when tires have lateral traction with the roadway.

If the tires lose traction, the rate of roll will increase and the microcomputer sends a signal to a servo valve mounted to the vehicle, the servo valve opening the proper ports to release compressed air to one or both pneumatic cylinders which forces down the outrigger wheels preventing vehicle overturn. In a further improvement, the electrical outputs from a speedometer, which measures vehicle forward speed, and an angular displacement gyro, which measures vehicle displacement from the vertical, are also coupled to the microcomputer to enable the microcomputer to make a more precise determination as to criticality of rate of roll.

The present invention thus provides a simplified, cost efficient method for automatically stabilizing a two wheel, or single track, vehicle by utilizing a microcomputer, accelerometer (rate gyro), angular displacement gyro and speedometer to provide the basic outrigger wheel control signals in lieu of either the heavy, expensive, complex systems or the driver dependent (nonautomatic) arrangements provided in the prior art.

BRIEF DESCRIPTION OF THE DRAWING

The foregoing aspects and other features of the invention are explained in the following description, taken in conjunction with the accompanying drawing wherein.

DETAILED DESCRIPTION

Figure 1:
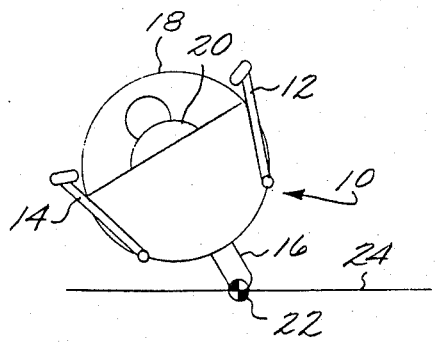
FIGS. 1 and 2 illustrate the movement of vehicle roll axis as traction approaches zero therefore lowering the polar moment of inertia.
Figure 2:
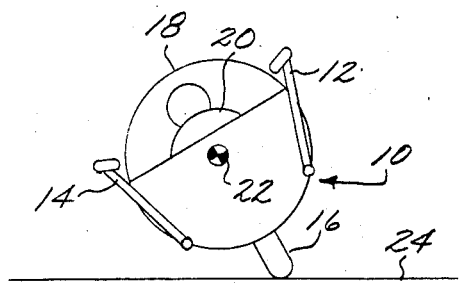

FIGS. 1 and 2 are simplified diagrams illustrating the movement of vehicle roll axis as traction approaches zero (tires lose traction). In particular a, two-wheeled, or a single track vehicle 10, is shown in a tilted position. The vehicle 10 is illustrated as including two outrigger wheels 12 and 14 and rear wheel 16 (front wheel is not observable in this view). Vehicle 10, in the illustration, is known as a body vehicle wherein an axial, elongated member 18 is used to enclose the rider 20 and portions of the vehicle 10 to reduce wind resistance and protect the driver and passenger. The present invention can be utilized with regular motorcycles, bicycles or any other two wheeled vehicle. The roll axis 22 of the vehicle 10 shown in FIG. 1 is at the point of contact of the two tires (tire 16 only illustrated) and the roadway 24 for the condition wherein there is negligible tire slip. As the traction approaches zero (due to a slippery roadway, for example) the roll axis 22 moves to the center of mass about the roll axis of the vehicle as shown in FIG. 2. It should be noted that the polar moment of inertia is simultaneously reduced as roll axis moves towards the center of mass allowing the vehicle 10 to roll at an increased rate.

Figure 3:
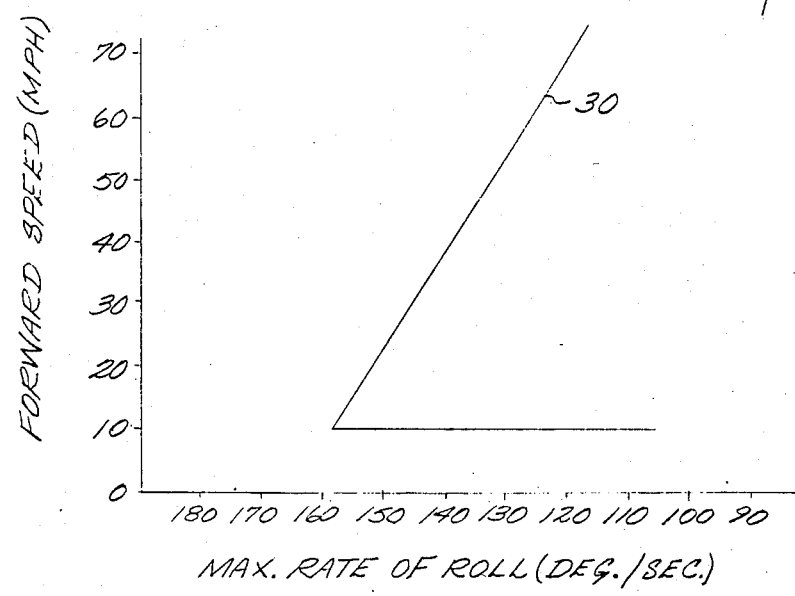
FIG. 3 is a graph portraying the maximum rate of roll of a typical vehicle to the forward speed of the vehicle.
Figure 4:
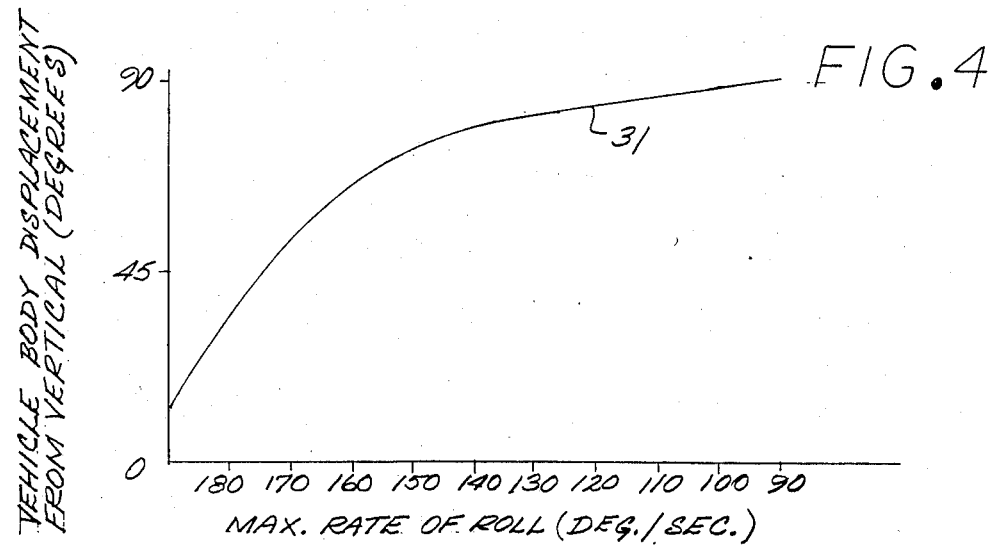
FIG. 4 is a graph portraying the maximum rate of roll of a typical vehicle to angular displacement of the vehicle from the vertical.

FIGS. 3 and 4 are graphs illustrating principles I have discovered regarding the stabilization of two-wheeled (one track) vehicles. The curve 30 in FIG. 3 is a typical plot for two wheeled vehicles for the rate of roll of the vehicle (degrees/second) and the forward speed of the vehicle (miles per hour), the curve 31 in FIG. 4 being a typical plot for the rate of roll of the vehicle and the vehicle (body) attitude (displacement) from the vertical axis (degrees). The actual shapes of the curves and parameters of the graphs are dependent on the actual physical parameters of the vehicle being utilized.

My basic discovery that rate of roll (with values modified by vehicle speed and body attitude from vertical) can be utilized to predict imminent vehicle overturning (implementation shown in FIG. 5) has enabled me to design an economical automatic system for sensing and preventing turnover of vehicle 10. Curves 30 and 31 define the limit of the controlled range, points of the graph falling on the right hand side of the curves being achievable (outrigger wheels up) while tires retain lateral traction, points of the graph falling on the left hand side of the curves being achievable only after the tires have lost lateral traction (i.e. the vehicle 10 is about to turn over, the outrigger wheels thus being forced down).

The reasons that traction approaches zero (rate of roll increases) are as follows:

(1) As the tire loses traction, its relationship with the roadway is now based on the coefficient of kinetic friction instead of the coefficient of static friction (for example, once the tire starts sliding it looses approximately 30% of its traction).

(2) Since friction is dependent on forces pressing two surfaces together, friction is reduced as tires lose lateral traction uncontrollably because some of the vehicle weight is in a free state accelerating towards the roadway anytime the vehicle is rolling from an upright position to an attitude deviating from the vertical. As the vehicle continues to roll, the force on the tire decreases to zero. In other words, traction approaches zero as the vehicle load transfers from the contact area of the tire to the center of gravity (roll axes) as the vehicle accelerates towards the roadway.

(3) Polar moment of inertia moves.

The rate of roll is the angular velocity about the vehicle roll axis. As noted, the roll axes moves up as the tires lose lateral traction in an uncontrollable manner. Moving the roll axis closer to the center of mass reduces the polar moment of inertia.

Figure 5:
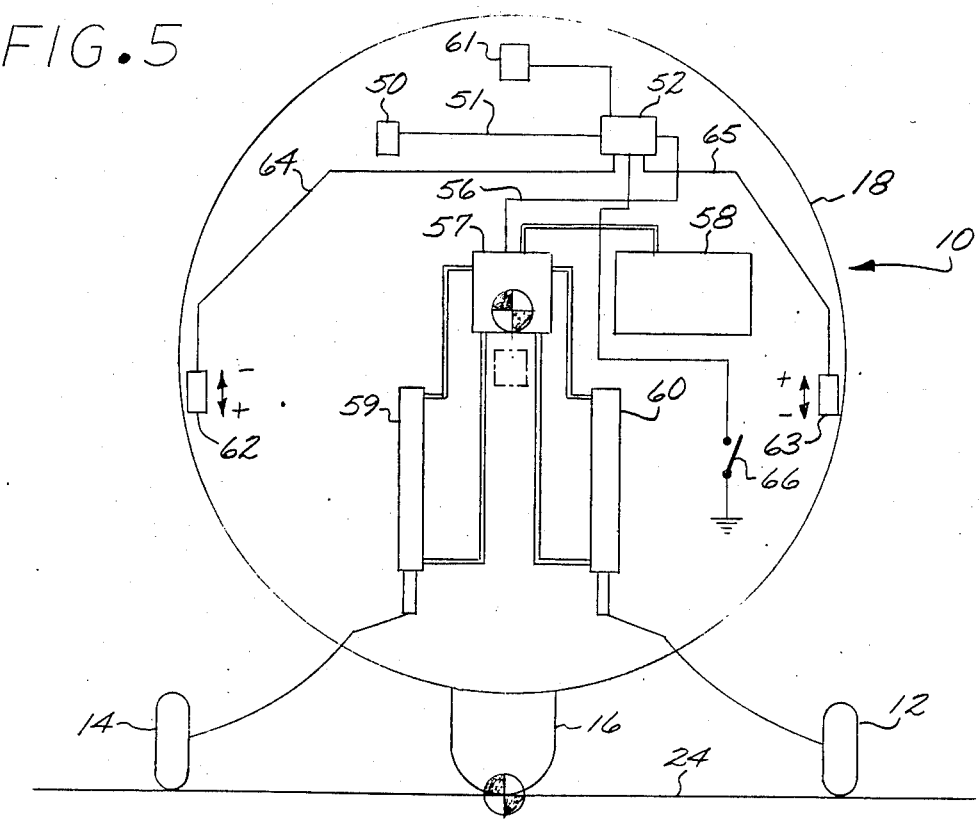
FIG. 5 is a schematic diagram of the automatic stabilizing system of the present invention utilized in a vehicle.

FIG. 5 is a simplified partial block diagram illustrating the principles of the present invention. Vehicle 10 is shown with outrigger wheels 12 and 14 in contact with roadway 24 which occurs either when the wheels are caused to automatically descend to right the vehicle 10 after the tires have started to lose traction, when the vehicle 10 is traveling too slow for the driver to balance or when vehicle 10 is stopped such that the outrigger wheels 12 and 14 act as a stand.

In accordance with the teachings of the present invention, a digital speedometer 50 is mounted within vehicle 10, the electric output thereof (representing the forward speed of vehicle 10 in miles per hour) is coupled to microprocessor 52 via lead 51. The electrical output from linear acceleromters 62 and 63 (orientated to measure tangential angular acceleration or rate of roll) is also coupled to microprocessor 52 via leads 64 and 65, respectively (it should be noted that accelerometers 62 and 63 can be alternately orientated to measure centripetal angular acceleration). It should be noted than a rate gyro 54 (illustrated in phantom) may be utilized in place of accelerometers 62 and 63, the rate of roll signal being coupled to microprocessor 52). An angular displacement measurement device 61, such as an angular displacement gyro, is coupled to microprocessor 52 via lead 55. The input signal to microprocessor 52 from accelerometers 62 and 63 is the sum of the two electrical signals generated by each accelerometer.

It should be noted that the system of the present invention can operate on the basis of the signal generated by the linear accelerometers (rate gyro) alone. The signals generated by the speedometer 50 and device 61 may be considered to be secondary input signals which allows the system to respond to the input from the accelerometers in a way more controllable by the driver i.e. uncontrollable tire slip to a novice driver may be controllable by an expert driver.

It should also be noted that the present invention can operate on the basis of the signal generated by the angular displacement gyro alone.

Microprocessor 52 is programmed to make logic decisions based on the graphs shown in FIGS. 2 and 3 (or to rate of roll alone). It responds to the three data inputs (rate of roll, speed and angular displacement or, as noted above, to rate of roll alone) and determines if these values are within the range possible when the tires have traction. If the tires loose traction, the rate of roll will increase and the microprocessor 52 sends a signal on lead 56 to servo valve 57 mounted to vehicle 10. The actual mechanism for moving the outrigger wheels 10 and 12 comprises a source of compressed air 58, servo valve 57, pneumatic cylinders 59 and 60 and the various linkages (shown schematically) to move the outrigger wheels to the proper position. Servo valve 57 opens the proper ports to power pneumatic cylinders 59 and 60 also mounted to the vehicle 10.

In one embodiment, the output signal from microprocessor 52 opens solenoid valve 57 which causes air from compressed air source 58 to act on cylinders 59 and 60 whereby both outrigger wheels 12 and 14 are forced into the fully down position and into contact with the roadway 24. Stability is regained in the upright position.

In another emhodiment, the output signal from microprocessor 52 opens servo valve 57 fully for only one outrigger wheel (on rolling side of vehicle 10). As the outrigger wheel touches roadway 24 and body roll is stopped, the accelerometer feeds this information back to microprocessor 52 which in turn sends a signal to close servo valve 57. This stops vehicle 10 from overturning or laying down on its side but does not immediately force vehicle 10 into an upright position. The driver may regain control of the vehicle while it is held at an attitude very close to that at which control was originally lost. After a predetermined pause (approximately 2 seconds) to allow the driver to regain control, both outrigger wheels are slowly lowered (valve 57 is partially opened) to raise vehicle 10 to the fully upright position.

It should be noted that the circular symbol with the alternating dark and light quadrants is used to designate the vehicle roll axis in all the figures.

The microcomputer 52 is additionally programmed to provide a signal to valve 57 when the vehicle 10 is stopped (based on input from speedometer) such that both vehicle wheels 12 and 14 are forced into contact with roadway 24. Other than for these conditions, microprocessor 52 provides a signal to valve 57 which causes outrigger wheels 12 and 14 to be retracted. It should be noted that while the speedometer 50 signal to lower the outrigger wheels 12 and 14 every time the speed drops below approximately 10 miles per hour, the rate of roll sensors (accelerometers 62 and 63 or rate gyro 54) will only signal to lower the outrigger wheels in emergency situations Thus a cautious driver may never lose lateral traction in which case the system of the present invention would not become operative.

It is believed that the implementation of the block diagram shown in FIG. 5 is within the capability of those skilled in the art. For example, utilizing the aforementioned discovery, a particular vehicle could be tested with curves equivalent to 30 and 31. Input to the microcomputer 52 then could be readily adjusted with variable resistors to provide appropriate output signals in response to data from the linear accelerometers 62 and 63 (rate gyro) speedometer 50 and device 61. Finally, the details of the mechanism for forcing the outrigger wheels down into contact with the roadway 24 or in retracted position have been implemented in prior art devices, such as the aforementioned U.S. Pat. No. 4,513,847, the teachings of which are necessary for an understanding of the present invention being incorporated herein by reference.

Figure 6:
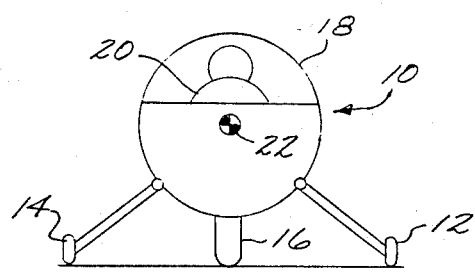
FIGS. 6-10 schematically illustrate the principles of the present invention.
Figure 7:
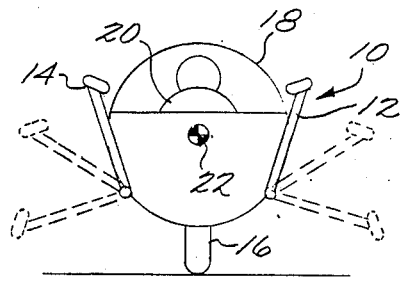
Figure 9:
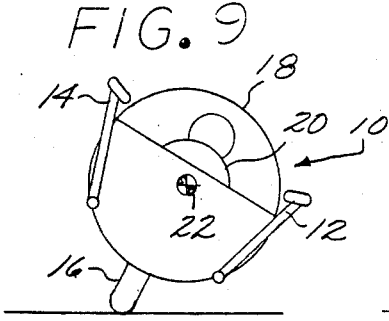
Figure 10:
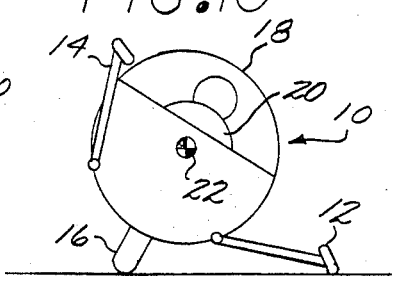
Figure 8:
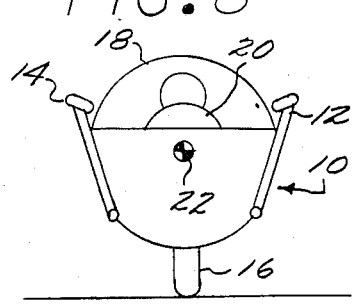

FIGS. 6-10 illustrate, in simplified form, the operation of the present invention. In FIG. 6, vehicle 10 is assumed in the start position with outrigger wheels 12 and 14 contacting roadway 24. In FIG. 7, outrigger wheels 12 and 14 are retracted as after vehicle 10 reaches a predetermined forward speed. FIG. 8 illustrates the normal riding mode of vehicle 10 traveling in a straight line (outrigger wheels 12 and 14 retracted). FIG. 9 illustrates the normal riding mode of vehicle 10 negotiating a curve (outrigger wheels 12 and 14 retracted). Finally, FIG. 10 illustrates the system after it has reacted to an out of control input signal based on rate of roll. As can be seen, the outrigger wheel on the side of the roll has been extended down into contact with the roadway 24 to provide three point support of the vehicle 10 (in another embodiment as noted hereinabove, both outrigger wheels 12 and 14 will be extended when microcomputer 52 determines that the tires have lost lateral traction).

After the vehicle 10 has been righted (stabilized), outrigger wheels 12 and 24 are held in contact with the roadway 24 until driver activated reset button 66 is depressed allowing the system to operate normally again.

The present invention thus provides a simplified, cost efficient method for stabilizing a two wheel vehicle without utilizing the cumbersome mechanical sensing arrangements provided in the prior art.

It is to be understood that the above described embodiment of the invention is illustrative only and that modifications thereof may occur to those skilled in the art. Accordingly, this invention is not to be regarded as limited to the embodiment disclosed herein, but is to be limited only as defined by the appended claims.

What is claimed is:

1. A system for stabilizing a two wheeled vehicle against lateral overturning, said vehicle having a front wheel and a rear wheel normally disposed in the same vertical plane, said stabilizing system comprising:
   a pair of outrigger wheels pivoting on the vehicle frame for vertical movement relative thereto and disposed respectively at opposite sides of said rear wheel in laterally outwardly spaced relation therefrom;
   means for sensing the roll rate of said vehicle and generating a first electrical signal in response thereto;
   mean responsive to said electrical signal for generating a second electrical signal if the rate of roll is greater than the limit achievable while said front and rear wheels retain lateral traction; and
   means responsive to said second electrical signal for moving at least one of said outrigger wheels downwardly into engagement with the roadway surface whereby the vehicle is enabled to return to a stable position.

2. The system of claim 1 wherein said sensing means comprises a rate gyro.

3. The system of claim 1 wherein said first sensing means comprises a pair of accelerometers, said first electrical signal comprising the sum of the signals generated by said pair of accelerometers.

4. The system of claim 1 wherein said responsive means comprises a microcomputer.

5. The system of claim 1 wherein engagement of said outrigger wheels with the roadway returns said vehicle to the stable position.

6. The system of claim 1 wherein activation of one of said outrigger wheels rights the vehicle to the extent to allow the vehicle driver to maneuver the vehicle to the stable position.

7. The system of claim 1 wherein both outrigger wheels are moved into engagement with the roadway by said responsive means.

8. A system for stabilizing a two wheeled vehicle against lateral overturning, said vehicle having a front wheel and a rear wheel normally disposed in the same vertical plane, said stabilizing system comprising:

a pair of outrigger wheels pivoting on the vehicle frame for vertical movement relative thereto and disposed respectively at opposite sides of said rear wheel in laterally outwardly spaced relation therefrom;

first means for sensing the roll rate of said vehicle and generating a first electrical signal in response thereto;

second means for sensing the foward speed of said vehicle and generating a second electrical signal in response thereto;

third means for sensing angular displacement from the vertical and generating a third electrical signal in response thereto;

means responsive to said first, second and third electrical signals for generating a fourth electrical signal if the rate of roll is greater than the limit achievable while said front and rear wheels retain lateral traction; and means responsive to said fourth electrical signal for moving at least one of said outrigger wheels downwardly into engagement with the roadway surface whereby the vehicle is enabled to return to a stable position.

9. The system of claim 8 wherein said first sensing means comprises a rate gyro.

10. The system of claim 8 wherein said first sensing means comprises a pair of accelerometers, said first electrical signal comprising the sum of the signals generated by said pair of accelerometers.

11. The system of claim 8 wherein said responsive means comprises a microcomputer.

12. The system of claim 8 wherein engagement of said outrigger wheels with the roadway returns said vehicle to the stable position.

13. The system of claim 8 wherein activation of one of said outrigger wheels rights the vehicle to the extent to allow the vehicle driver to meneuver the vehicle to the stable position.

14. The system of claim 8 wherein both outrigger wheels are moved into engagement with the roadway by said responsive means.

15. The system of claim 8 wherein said second sensing means comprises a digital speedometer.

16. The system of claim 8 wherein said third sensing means comprises a displacement gyro.

17. A system for stabilizing a two wheeled vehicle against lateral overturning, said vehicle having a front wheel and a rear wheel normally disposed in the same vertical plane, said stabilizing system comprising:

a pair of outrigger wheels pivoting on the vehicle frame for vertical movement relative thereto and disposed respectively at opposite sides of said rear wheel in laterally outwardly spaced relation therefrom;

means for sensing the angular displacement from vertical of said vehicle and generating a first electrical signal in response thereto;

means responsive to said electrical signal for generating a second electrical signal if the angular displacement from vertical is greater than a preset limit.

means responsive to said second electrical signal for moving at least one of said outrigger wheels downwardly into engagement with the roadway surface whereby the vehicle is enabled to return to a stable position.

18. The system of claim 17 wherein said sensing means comprises an angular displacement gyro.

19. The system of claim 17 wherein said responsive means comprises a microcomputer.

20. The system of claim 17 wherein engagement of said outrigger wheels with the roadway returns said vehicle to the stable position.

21. The system of claim 17 wherein activation of one of said outrigger wheels rights the vehicle to the extent to allow the vehicle driver to maneuver the vehicle to the stable position.

22. The system of claim 17 wherein both outrigger wheels are moved into engagement with the roadway by said responsive means.

* * * * *